United States Patent [19]

Garcia

[11] Patent Number: 5,894,033

[45] Date of Patent: Apr. 13, 1999

[54] METHOD OF PROFILING THE TERMINATION PASTE FOR CHIP CAPACITOR ELECTRODES

[75] Inventor: Doug J. Garcia, Escondido, Calif.

[73] Assignee: Electro Scientific Industries, Portland, Oreg.

[21] Appl. No.: 08/953,657

[22] Filed: Oct. 17, 1997

[51] Int. Cl.[6] ................................................. B05D 5/12
[52] U.S. Cl. .................... 427/79; 427/284; 427/430.1; 29/874; 29/885; 29/25.42; 228/180.21
[58] Field of Search .......................... 427/79, 284, 357, 427/430.1, 443.2; 361/311; 29/874, 885, 25.42; 228/180.21

[56] References Cited

U.S. PATENT DOCUMENTS

| | | | |
|---|---|---|---|
| 4,310,566 | 1/1982 | McGrath | 427/284 |
| 4,393,808 | 7/1983 | Braden | 118/503 |
| 4,664,943 | 5/1987 | Nitta et al. | 427/79 |
| 5,296,262 | 3/1994 | Didden | 427/284 |

*Primary Examiner*—Brian K. Talbot
*Attorney, Agent, or Firm*—John J. Murphey

[57] ABSTRACT

A method of profiling the border of termination paste applied to a chip capacitor electrode comprising the steps of casting a layer of termination paste of finite thickness; passing a profiling element through the upper part of the layer of paste, the element having an exterior profile that is arranged to dip into the paste and scrape some of the paste from the upper part of the paste layer to form a reverse profile in the layer of the paste; and, dipping a chip capacitor electrode into the paste layer at the reverse profile formed therein, to terminate the capacitor with the profile formed in the paste.

16 Claims, 2 Drawing Sheets

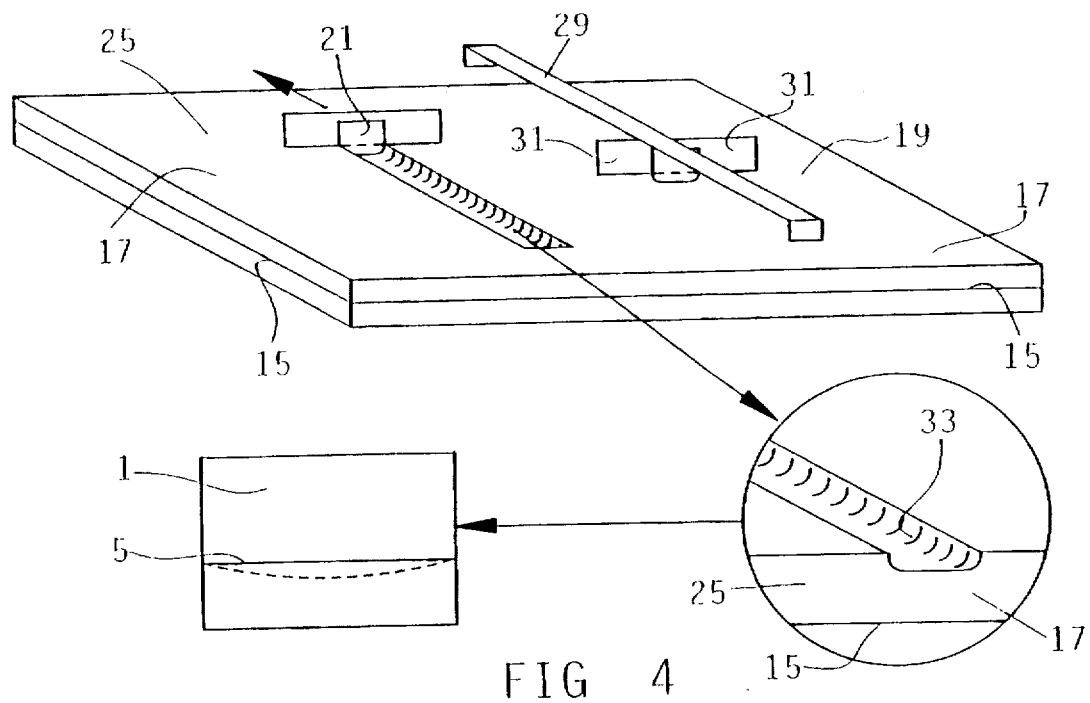
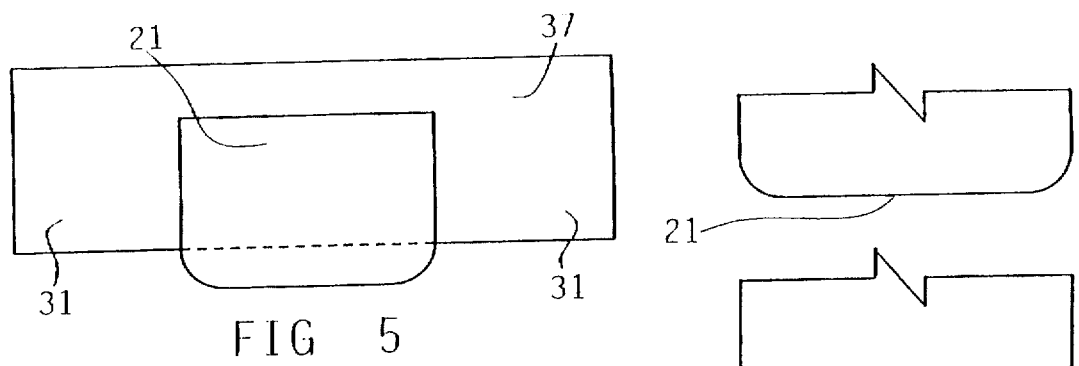
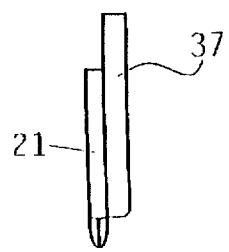
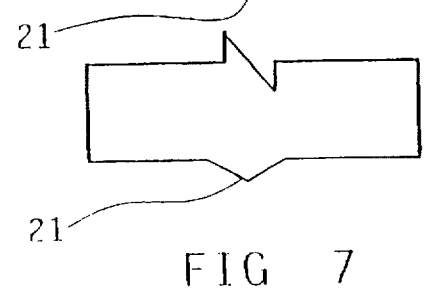

METHOD OF PROFILING THE TERMINATION PASTE FOR CHIP CAPACITOR ELECTRODES

BACKGROUND OF THE INVENTION

1. Field of the Invention

This invention pertains to the field of computer chip capacitor electrode termination. More particularly, this invention is a unique method of profiling the wet paste layer to control the border the termination paste makes with the computer chip capacitor (chip) to insure that there are no areas where the paste dips toward the edge of the chip or thins out to adversely affect the ultimate properties of the finished chip.

2. Description of the Prior Art

Computers and other electronic appliances are growing in importance in our daily lives at a rate that appears to be reaching exponential proportions. These electronic devices reach all ages and areas of endeavor. Infants are exposed to computers through electronically-based games that teach musical tones and image recognition, such as cows, trucks, bananas, etc. Preschoolers play games on computers that lay the basis for later learning math, reading and geography. Elementary, Junior High, High School and College students take classes in computer theory, programming and operation. For those who entered the work force before computers became a part of the school curriculum, there are seminars, home-study courses and public television courses that introduce one to computers, computer operation and software operation. Virtually every business in the United States of America uses computers somewhere in its operation.

The use of computers to undertake business functions and educational activities has created a demand for more computer capacity and faster processing times. What started out as a simple Commodore® 64 computer with black/white monitor (having 64 k of memory utilizing a very short program) now is a 1–32 megabyte RAM/5 Gigabyte hard drive computer with color monitor, offering programs that include moving pictures and music. In addition, other electronic devices, such as VCRs, television sets, cameras, camcorders, auto alarms, radios and the like are using more and more computer hardware to become more user-friendly with expanded capabilities. Competition among various electronic companies has forced computer and computer-accessory manufacturers to design more powerful and more capable circuitry. Just one indication of the astonishing rate of computer development is seen in the case of hard drives. In the past 15 years, hard drive storage capacity has increased at an average annual rate of a factor of three. Where in 1982 a standard hard drive was 10 megabytes, it has grown to 5 Gigabytes in 1997.

At the center of all this activity is a device so small that one could easily miss its existence, if not careful to look for it. It is a miniature capacitor, of a general size of 0.040 inches long with a square or rectangular cross-section 0.020 inches on a side, with spaced-apart flat end surfaces. These devices are constructed of multiple layers of electrically conductive material held apart by a ceramic dielectric matrix that is fired to produce a hard, minute device much smaller than a grain of rice. Used by the thousands in computer circuitry, these capacitors, called "chips" by those in the trade, are in great demand.

In the circuitry, they are soldered directly to the computer circuit board on their flat side surface and often resemble miniature bumps on the circuit board. For this special soldering technique, the end or edge surfaces of the conductive layers in the chips are coated with a silver paste and fired, at high heat, to cure or set the silver paste to a coating that is easily soldered to a specially designed copper "flat" located on the computer circuit board. To coat these ends of the chips there has been invented hand-operated tools with which to position the chips for coating with a wet, curable compound, reference U.S. Pat. Nos. 4,381,321; 4,393,808; 4,395,184; and 4,526,129.

In this prior art practice, a layer of the wet paste is cast on a planar surface, the top of the layer is scraped to a level surface of desired thickness (usually 0.005 inches), and then the chips are dipped into the layer to apply a coat of the paste in a band along the chip edge to a depth of 0.005 inches. The chip with its band of wet paste is then passed through a dryer and then the chip reversed and the opposite, uncoated edge dipped in another, similar layer of paste and then dried to complete the termination process.

A problem has developed in that the surface tension of the paste causes a momentary "belly" or dip to form along the entire length of the chip edge when it is dipped in the paste and about its edges with the lowest part of the dip being at the middle of the chip. Surface tension forces and the wettability of the paste blend out much of this belly over the next few seconds, however the surface tension at the corners of the chip remains unaffected, due in large part to the high tension at the sharp corners. The border of paste thereafter formed on the chip electrode often displays a distinct lower area or dip at the corner edges. Such unevenness in the border creates problems of current density coming into the chip from the underlying circuit tracing to which the chip is soldered. Additionally, the unevenness in the border at the corners of the chip results in less silver at the corners which makes the chip susceptible to damage during testing and/or mounting. Still further, when the border is uneven, the higher border at the middle of a chip whose corners are at the proper border height represents more silver than is necessary to terminate the chip and, when multiplied by the large number of chips that have this malady, represents a direct loss of value in the chip.

Changing the density of the paste, adding surface tension modifiers to the paste, and other such potential remedies have not proven adequate because of the effects they have on other properties of the chip.

SUMMARY OF THE INVENTION

This invention is a method of solving this dipping problem without changing anything in the paste. It is accomplished by profiling the top surface of the wet paste layer before the chip is dipped into the paste and designing this profile to overcome the failure of the surface tension to fully attenuate the "bellying" or dip produced in the chip. The result is that the border of paste on the chip, above the lower edge of the chip, is made straight and parallel to the lower edge. This cures the problem of the dip in the border and the subsequent problems that stem therefrom.

In addition, this method provides a unique means of profiling other chips where, for sundry reasons, the border of the paste is required to be slanted, curved or otherwise different from that which results when chip is dipped into a mere flat sheet of paste.

The invention is a method of profiling the border of termination paste applied to a chip capacitor electrode comprising the steps of casting a layer of wet termination paste of finite thickness made on top of a planar surface; scraping the top of the layer of paste to form a flat top surface on the layer; passing an element through the part of the layer of paste, below said flat top surface of said layer and spaced-above said planar surface, said element having an exterior profile that is arranged to dip into said paste and scrape some of the paste from the upper part of the paste layer for terminating said capacitor with paste where the upper surface of the paste applied to the electrode forms a border on the chip that is straight and parallel to the bottom edge of the chip; and, dipping the chip capacitor electrode into the profiled paste layer, at the profile formed therein, to terminate the capacitor with paste having the profile formed therein.

Accordingly, the main object of this invention is a method for solving the problem that has been plaguing the chip capacity industry for years, namely a method of straightening out the border between the paste and the chip. Other objects of the invention include a method of profiling a wet layer of paste to achieve a desired border configuration on a finished terminated chip; a method of utilizing the practice in the prior art of hand-dipping chips to insure the border formed between the chip and the paste is straight across the chip and parallel to and edge of the chip; a method of straightening out the border between the paste and the edge of the chip without affecting the properties of the wet paste formulation; and, a method of preserving the electrical properties of the chip and removing any variation of properties based upon waviness in the border of the paste.

These and other objects of the invention may be determined by reading the description of the preferred embodiments along with the drawings attached hereto. The scope of protection sought by the inventor may be gleaned from a fair reading of the claims that conclude this specification.

DESCRIPTION OF THE DRAWINGS

FIG. 4 is an illustrative view of the element being passed along the top region of the layer of paste, the furrow it makes and how it affects the chip dipped therein;

FIG. 5 is an end view of a typical element construction;

FIG. 6 is a side view of the element shown in FIG. 5; and,

FIG. 7 is a side view of a group of typical profiles that can be made in the element for passing onto to the chip.

DESCRIPTION OF THE PREFERRED EMBODIMENT

Figure 1:
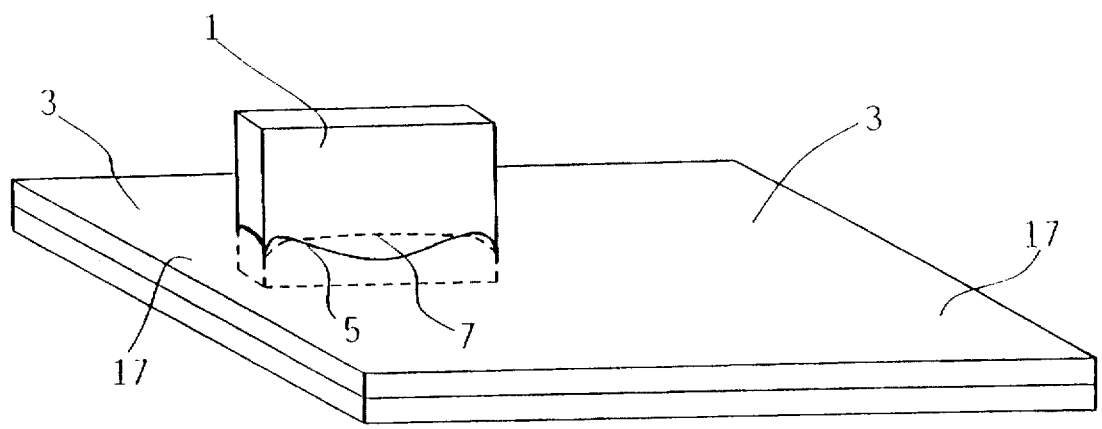
FIG. 1 is an enlarged illustrative view of the typical chip being dipped in a layer of paste and the non-wetting of the paste on the chip.

Turning now to the drawings where elements are marked with numbers and like elements are marked with like numbers throughout the seven figures, FIG. 1 shows a typical chip 1 being dipped into a layer of paste 3 where the top of the paste forms a border 5 of paste on the chip. Since the entire end of chip 1 is covered with the termination paste, there can be no lower or bottom border but just one border, the upper border, that is referred to herein as the "border".

Figure 2:
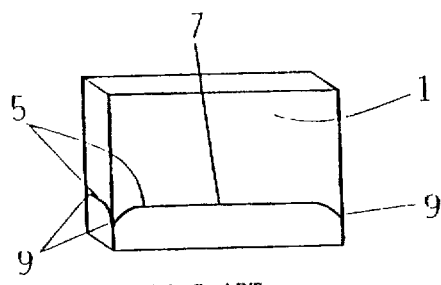
FIG. 2 is an illustrative view of the chip showing the wavy border of paste after termination.

As can be easily seen, surface tension and the lack of instant wetting of the paste on the chip causes border 5 to belly or dip downward all along the chip interface. As also shown in FIG. 1 by dotted line, paste wetting and recovery from surface tension cause border 5 to raise somewhat along the center 7 of chip 1. As shown in FIG. 2, when chip 1 is lifted from the paste layer, border 5 shows recovery of the dip at chip center 7 but still shows the dip at the corners 9 of said chip.

Figure 3:
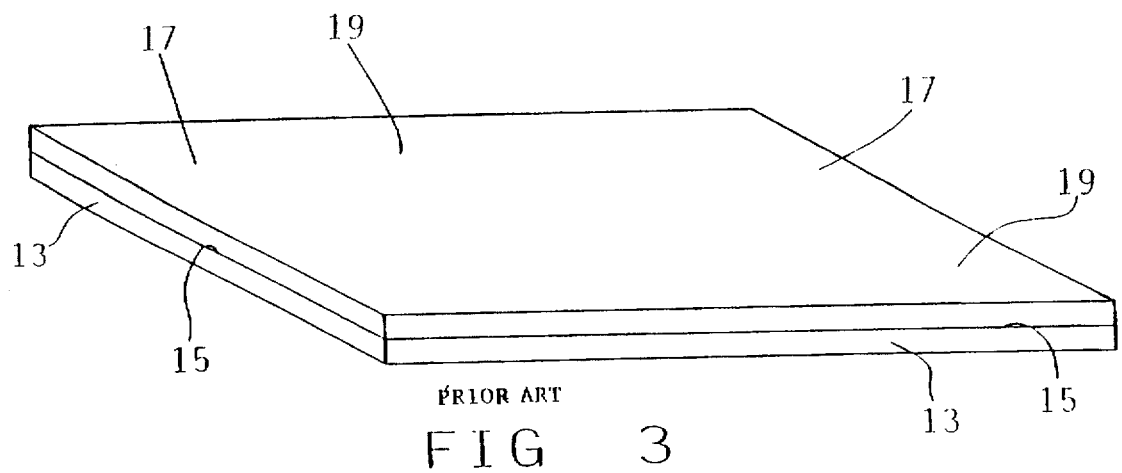
FIG. 3 is an illustrative view of a layer of paste cast on a planar surface.

As shown in FIG. 3, a typical practice in the prior art is to cast paste on a termination plate 13 having a flat action planar surface 15. An element (not shown) is usually passed over the layer 17 of newly cast paste to form a top surface 19 that is smooth and parallel to planar surface 15.

In this invention, a profiling element 21, as shown in FIG. 4, is passed through the upper part 25 of layer 17 of paste, below smooth and flat top surface 19 spaced-above flat action planar surface 15, said element having an exterior profile that is arranged to dip into said paste and scrape some of the paste from the upper part of paste layer 17 to form a reverse profile in the layer of paste. It is preferred that profiling element 21 be mounted on a track 29, as shown in FIG. 4, and include a pair of wings 31 extending out from each side thereof to scrape the paste entirely off top surface 19. When profiling element 21 is affixed to track 29, it makes a furrow 33 in top surface 19 of paste layer 17.

As shown in FIG. 4, the profile established in wet paste layer 17 is the exact opposite to that of profiling element 21. Due to the thixotropic nature of the wet paste, this reverse profile will remain established for enough time that chip 1 or a plurality of chips can be dipped into the wet paste and take on a border that is the profile of profiling element 21.

Element 21 may be constructed from a wide variety of materials. Those that are strong, easy to machine, relatively light weight, show freedom from deterioration, and that are relatively inexpensive are good candidates. Examples of such materials are stainless steel and beryllium copper glued to stainless steel.

FIGS. 5 and 6 show one such example where a profiling element 21 of 0.020 inches thick beryllium copper is glued to a mounting plate 37 of stainless steel where wings 31 are formed in said plate 37 and extend outward from said profile 27 to aid in removing the scraped-away paste from the place of dipping. In production, profiling element 21 and mounting plate 37 will be made in one piece for ruggedness of design and longevity of use.

FIG. 7 shows a number of profiles than could be imparted to the layer of paste by profiling element 21. These would depend upon the characteristics of the paste including the viscosity, wettability, density, surface tension and the like.

While the invention has been described with reference to a particular embodiment thereof, those skilled in the art will be able to make various modifications to the described embodiment of the invention without departing from the true spirit and scope thereof. It is intended that all combinations of elements and steps which perform substantially the same function in substantially the way to achieve substantially the same result are within the scope of this invention.

What is claimed is:

1. A method of profiling the border of termination paste applied to a chip capacitor electrode comprising the steps of:
    a) casting a layer of termination paste of finite thickness;
    b) passing a profiling element through the upper part of the layer of paste, said element having an exterior reverse profile that is arranged to dip into said paste and scrape some of the paste from the upper part of the paste layer to form a reverse profile in said layer of said paste; and,
    c) dipping a chip capacitor electrode into the paste layer at said reverse profile formed therein, to terminate said capacitor with the profile formed in the paste.

2. The method of profiling the border of termination paste of claim 1 where the step of casting a layer of termination paste of finite thickness is made on top of a planar surface.

3. The method of profiling the border of termination paste of claim 1 where the step of casting a layer of termination paste is followed by the step of scraping the top of the layer of paste to form a flat top surface on the layer.

4. The method of profiling the border of termination paste of claim 3 where the step of passing a profiling element through the upper part of the layer of paste, below said flat top surface of said layer, said element having an exterior profile that is arranged to dip into said paste and scrape some of the paste from the upper part of the paste layer to form a reverse profile in said paste is followed by the step of terminating said capacitor with paste where the upper surface of the paste applied to the electrode forms a border that is straight and parallel to the bottom edge of the chip.

5. The method of profiling the border of termination paste of claim 3 where the step of passing a profiling element through the upper part of the layer of paste, below said flat top surface of said layer, said profiling element having an exterior profile that is arranged to dip into said paste and scrape some of the paste from the upper part of the paste layer to form a reverse profile in said paste includes using a pair of wings extending from each side of the element to aid in scraping the paste from about the profile and is followed by the step of terminating said capacitor with paste where the upper surface of the paste applied to the electrode forms a border that is straight and parallel to the bottom edge of the chip.

6. The method of profiling the border of termination paste of claim 1 where the profile formed in the top of the layer of paste is curved.

7. The method of profiling the border of termination paste of claim 1 wherein the profile formed in the top of the layer of paste is a smooth curve that is deep in the center and shallow at the edges.

8. The method of profiling the border of termination paste of claim 3 wherein the step, of passing a profiling element through the upper part of the layer of paste, below said flat top surface of said layer, said element having an exterior profile that is arranged to dip into said paste and scrape some of the paste from the upper part of the paste layer to form a reverse profile in said of said paste, is repeated across the width of the layer of paste to allow a plurality of chip capacitors to be terminated in one operation.

9. A method of profiling the border of termination paste applied to a chip capacitor electrode comprising the steps of:

a) casting a layer of termination paste of finite thickness on top of a planar surface;

b) scraping the top of the layer of paste to form a flat top surface on the layer;

c) passing a profiling element through the upper part of the layer of paste, below said flat top surface of said layer and spaced-above said planar surface, said element having an exterior profile that is arranged to dip into said paste and scrape some of the paste from the upper part of the paste layer for terminating said capacitor with paste where, after interplay of paste wetting and surface tension phenomena, the upper surface of the paste applied to the electrode forms a border that is straight and parallel to the bottom edge of the chip; and, d) dipping the chip capacitor electrode into the paste layer, at said profile formed therein, to terminate said capacitor with paste having the profile formed therein.

10. The method of profiling the border of termination paste applied to a chip capacitor electrode of claim 9 wherein the border of the profile formed on the electrode is parallel to the lower edge of the electrode.

11. The method of profiling the border of termination paste of claim 9 where the profile formed in the top of the layer of paste is curved.

12. The method of profiling the border of termination paste of claim 9 wherein the profile formed in the top of the layer of paste is a smooth curve that is deep in the center and shallow at the edges.

13. The method of profiling the border of termination paste of claim 9 wherein the step, of passing a profiling element through the upper part of the layer of paste, below said flat top surface of said layer, said element having an exterior profile that is arranged to dip into said paste and scrape some of the paste from the upper part of the paste layer to form a reverse profile in said of said paste, is repeated across the width of the layer of paste to allow a plurality of chip capacitors to be terminated in one operation.

14. The method of profiling the border of termination paste of claim 9 wherein said profiling element is monolithic is design and comprises a profiling blade, having formed thereon the reverse profile that is to be imparted on said top surface of said layer of paste, and mounting plate on which said profiling blade is mounted.

15. The terminated chip produced by the process of claim 1.

16. The terminated chip produced by the process of claim 9.

* * * * *